US 8,010,480 B2

(12) United States Patent
Dave et al.

(10) Patent No.: US 8,010,480 B2
(45) Date of Patent: *Aug. 30, 2011

(54) SELECTING HIGH QUALITY TEXT WITHIN IDENTIFIED REVIEWS FOR DISPLAY IN REVIEW SNIPPETS

(75) Inventors: Kushal B. Dave, New York, NY (US); Jeremy A. Hylton, Easton, PA (US)

(73) Assignee: Google Inc., Mountain View, CA (US)

( * ) Notice: Subject to any disclaimer, the term of this patent is extended or adjusted under 35 U.S.C. 154(b) by 1197 days.

This patent is subject to a terminal disclaimer.

(21) Appl. No.: 11/241,702

(22) Filed: Sep. 30, 2005

(65) Prior Publication Data

US 2007/0078671 A1   Apr. 5, 2007

(51) Int. Cl.
*G06F 15/00* (2006.01)
*G06F 15/18* (2006.01)

(52) U.S. Cl. ............................................. 706/62; 706/45
(58) Field of Classification Search .................. 706/11, 706/45, 46, 50, 60, 62; 707/1, 7, 100; 705/1, 705/10, 500

See application file for complete search history.

(56) References Cited

U.S. PATENT DOCUMENTS

| | | | | |
|---|---|---|---|---|
| 5,724,571 A | 3/1998 | Woods | | 395/605 |
| 6,064,980 A | 5/2000 | Jacobi et al. | | 705/26 |
| 6,182,063 B1 | 1/2001 | Woods | | 707/3 |
| 6,260,064 B1 | 7/2001 | Kurzrok | | 709/224 |
| 6,334,132 B1 | 12/2001 | Weeks | | 707/101 |
| 6,594,658 B2 | 7/2003 | Woods | | 707/5 |
| 6,598,026 B1 | 7/2003 | Ojha et al. | | 705/26 |
| 6,718,324 B2 | 4/2004 | Edlund et al. | | 707/5 |
| 6,807,566 B1 | 10/2004 | Bates et al. | | 709/206 |
| 6,892,178 B1 | 5/2005 | Zacharia | | 705/10 |
| 6,892,179 B1 | 5/2005 | Zacharia | | 705/10 |
| 6,912,505 B2 | 6/2005 | Linden et al. | | 705/14 |
| 6,963,848 B1 * | 11/2005 | Brinkerhoff | | 705/10 |
| 7,013,303 B2 | 3/2006 | Faybishenko et al. | | 707/10 |
| 7,039,631 B1 | 5/2006 | Finger, II | | 707/3 |
| 7,343,374 B2 | 3/2008 | Berkhin | | 707/5 |
| 7,406,436 B1 | 7/2008 | Reisman | | 705/10 |
| 7,428,496 B1 | 9/2008 | Keller et al. | | 705/10 |
| 7,433,832 B1 | 10/2008 | Bezos et al. | | 705/26 |
| 7,461,051 B2 | 12/2008 | Lavine | | 707/3 |
| 7,467,206 B2 | 12/2008 | Moore et al. | | 709/225 |
| 7,493,320 B2 | 2/2009 | Canright et al. | | 707/5 |
| 7,519,562 B1 * | 4/2009 | Vander Mey et al. | | 705/500 |
| 7,620,651 B2 | 11/2009 | Chea et al. | | 707/102 |
| 2002/0046203 A1 * | 4/2002 | Siegel et al. | | 707/1 |
| 2002/0165905 A1 * | 11/2002 | Wilson | | 709/203 |
| 2002/0193066 A1 | 12/2002 | Connelly | | 455/2.01 |
| 2004/0030525 A1 | 2/2004 | Robinson et al. | | 702/127 |
| 2004/0117340 A1 * | 6/2004 | Blitzer | | 707/1 |

(Continued)

OTHER PUBLICATIONS

Hu et al., "Mining and Summarizing Customer Reviews", 2004, pp. 168-177.*

(Continued)

*Primary Examiner* — Omar F Fernandez Rivas
(74) *Attorney, Agent, or Firm* — Morgan, Lewis & Bockius LLP

(57) ABSTRACT

A method and system of selecting content from reviews for display are described. A review is identified and partitioned. A subset of the partitions is selected based on predefined criteria. A snippet is generated from the selected partitions. A response that includes the snippet is generated.

19 Claims, 7 Drawing Sheets

U.S. PATENT DOCUMENTS

| | | | |
|---|---|---|---|
| 2004/0225577 A1 | 11/2004 | Robinson | 705/26 |
| 2004/0225672 A1 | 11/2004 | Landers et al. | 707/102 |
| 2005/0027685 A1 | 2/2005 | Kamvar et al. | 707/2 |
| 2005/0034071 A1 | 2/2005 | Musgrove et al. | 715/530 |
| 2005/0091038 A1 | 4/2005 | Yi et al. | 704/10 |
| 2005/0131918 A1* | 6/2005 | Hillis et al. | 707/100 |
| 2005/0137939 A1 | 6/2005 | Calabria et al. | 705/26 |
| 2006/0064343 A1 | 3/2006 | Burke et al. | 705/10 |
| 2006/0129446 A1* | 6/2006 | Ruhl et al. | 705/10 |
| 2006/0143158 A1 | 6/2006 | Ruhl et al. | 707/3 |
| 2006/0282762 A1 | 12/2006 | Diamond et al. | 715/511 |
| 2007/0033092 A1 | 2/2007 | Iams | 705/10 |
| 2007/0038620 A1 | 2/2007 | Ka et al. | 707/5 |
| 2007/0078669 A1* | 4/2007 | Dave et al. | 705/1 |
| 2007/0078670 A1* | 4/2007 | Dave et al. | 705/1 |
| 2007/0078699 A1 | 4/2007 | Scott et al. | 705/10 |
| 2007/0078845 A1* | 4/2007 | Scott et al. | 707/5 |
| 2007/0078851 A1* | 4/2007 | Grell et al. | 707/7 |
| 2007/0208613 A1 | 9/2007 | Backer | 705/10 |
| 2008/0015925 A1 | 1/2008 | Sundaresan | 705/10 |
| 2008/0120166 A1 | 5/2008 | Fernandez et al. | 705/10 |
| 2008/0256040 A1 | 10/2008 | Sundaresan et al. | 707/3 |

OTHER PUBLICATIONS

Church, K. W. and Gale, W. A. "Inverse document frequency (IDF): A measure of deviations from Poisson", Proceedings of the Third Workshop on Very Large Corpora, 1995, pp. 121-130.*

Kushal, D.B., et al., "Mining the Peanut Gallery: Opinion Extraction and Semantic Classification of Product Reviews", *WWW 2003*, May 20-24, 2003, Budapest, Hungary.

Hu, M., et al., "Mining Opinion Features in Customer Reviews", *Proceedings of Nineteenth National Conference on Artificial Intelligence (AAAI-2004)*, Jul. 2004, San Jose, CA.

Nigam, K., et al., "Towards a Robust Metric of Opinion", *Proceedings of Nineteenth National Conference on Artificial Intelligence (AAAI-2004)*, Jul. 2004, San Jose, CA.

Yi, J., et al., "Sentiment Analyzer: Extracting Sentiments about a Given Topic using Natural Language Processing Techniques", *Proceedings of the Third IEEE International Conference on Data Mining*, 2003.

Hu, M., et al., "Mining and Summarizing Customer Reviews", *KDD '04*, Aug. 22-25, 2004, Seattle, WA.

Abonyi, et al., "Computational Intelligence in Data Mining," Informatica, An International Journal of Computing and Informatics, vol. 29, No. 1, May 2005, pp. 3-121.

Berkhin, "A Survey on PageRank Computing," Internet Mathematics, vol. 2, No. 1, pp. 73-120.

Borodin, "Link Analysis Ranking: Algorithms, Theory and Experiments," ACM Transactions on Internet Technology, vol. 5, No. 1, Feb. 2005, pp. 231-297.

Church et al., "Inverse document frequency (IDF): a measure of deviations from Poisson," AT&T Bell Laboratories, 1995, pp. 121-130.

Ding et al., "Link Analysis: Hubs and Authorities on the World Wide Web," LBNL Tech Report 47847, May 7, 2001, 12 pgs.

Ding et al., Link Analysis: Hubs and Authorities on the World Wide Web, SIAM Review, vol. 46, No. 2, 2004, 13 pgs.

O'Donovan et al., "Personalizing Trust in Online Auctions," Adaptive Information Cluster, School of Computer Science and Informatics, 2003, 12 pgs.

Furner, "On Recommending," Journal of the American Society for Information Science and Technology, 2002, pp. 1-27.

Gibson, "Communities and Reputation on the Web," UMI Microform 3082196, 2003, pp. 1-106.

Google: Google Gram—Google launches Froogle, M2 Presswire, Coventry, May 22, 2005, 1 pg.

Guha et al., "Propagation of Trust and Distrust," ACM, May 17-22, 2004, 10 pgs.

Haveliwala et al., "The Second Eigenvalue of the Google Matrix," Technical Report, Stanford, 2003, 8 pgs.

Haveliwala, "Topic-Sensitive PageRank: A Context-Sensitive Ranking Algorithm for Web Search," IEEE Transactions on Knowledge and Data Engineering, vol. 15, No. 4, Jul./Aug. 2003, pp. 784-796.

Kamvar et al., "The EigenTrust Algorithm for Reputation Management in P2P Networks," ACM, May 20-24, 2003, 12 pgs.

Kleinberg, "Authoritative Sources in a Hyperlinked Environment," Proceedings of the ACM-SIAM on Discrete Algorithms, 1998, IBM Research Report RJ 10076, May 1997, pp. 1-33.

Kurchak, Notes application strategies: document rating, IBM, Apr. 5, 2004, 16 pgs.

Langville et al., "A Survey of Eigenvector Methods for Web Information Retrieval," Department of Mathematics, North Carolina State University, Dec. 17, 2003, , pp. 1-26.

Langville et al., "Deeper Inside PageRank," Internet Mathematics vol. 1, No. 3, Oct. 1, 2003, pp. 335-380.

Lempel et al., "Rank-Stability and Rank-Similarity of Link-Based Web Ranking Algorithms in Authority-Connected Graphs," Information Retrieval, 8, vol. 8, 2005, pp. 245-264.

Malaga et al., Web-Based Reputation Management Systems: Problems and Suggested Solutions, Electronic Commerce Research, vol. 1, 2001, pp. 403-417.

Massa et al., "Page-reRank: Using Trusted Links to Re-rank Authority," IEEE/WIC/ACM International Conference on Web Intelligence, 2005, 15 pgs.

Massa et al., "Trust-Aware Collaborative Filtering for Recommender Systems," LNCS 3290, 2004, pp. 492-508.

Mendelzon et al., "What do the Neighbours Think? Computing Web Page Reputations," IEEE Computer Society Technical Committee on Data Engineering, 2000, pp. 1-8.

Mui et al., "Evaluating Reputation in Multi-agents Systems," AAMAS 2002 Ws Trust, Reputation, LNAI 2631, 2003, pp. 123-137.

Palme, "How to integrate the SELECT rating service with other Web services?", Publisher:www.sztaki.hu, May 2001, pp. A-1, A-2, B-1, B-2 http://web.archive.org/web/20010502234530/www.sztaki.hu/SELECT/integration.html.

ProQuest, "My Research," 2008, 1 pg.

Resnick et al., "Reputation Systems," Association for Computing Machinery, Communications of the ACM, Dec. 2000, vol. 43, No. 13, pp. 45-48.

Richardson et al., Trust management for the Semantic Web, Proceedings of the 2nd International Semantic Web Conference, 2003, 17 pgs.

Riggs et al., "An Algorithm for Automated Rating of Reviewers," JCDL 2001, Jun. 24-28, 2001, pp. 381-387.

Wang et al., "Computing PageRank in a Distributed Internet Search System," Proceedings of the 30th VLDB Conference, 2004, pp. 420-431.

Zacharia et al., "Collaborative reputation mechanisms for electronic marketplace," Decision Support Systems 29 2000, pp. 371-388.

Zhang et al., "A Web Analysis Algorithm Combined with Content Correlation Analysis Method," J. Computer Science & Technology, Jan. 2003, vol. 18, No. 1, pp. 114-117.

* cited by examiner

SELECTING HIGH QUALITY TEXT WITHIN IDENTIFIED REVIEWS FOR DISPLAY IN REVIEW SNIPPETS

RELATED APPLICATIONS

This application is related to the following applications, each of which is hereby incorporated by reference:

U.S. patent application Ser. No. 11/241,698, "Selecting Representative Reviews for Display," filed Sep. 30, 2005;

U.S. patent application Ser. No. 11/241,701, "Selecting High Quality Reviews for Display," filed Sep. 30, 2005;

U.S. patent application Ser. No. 11/241,694, "Identifying Clusters of Similar Reviews and Displaying Representative Reviews from Multiple Clusters," filed Sep. 30, 2005; and U.S. patent application Ser. No. 11/241,693, "Systems and Methods for Reputation Management," filed Sep. 30, 2005.

TECHNICAL FIELD

The disclosed embodiments relate generally to search engines. More particularly, the disclosed embodiments relate to methods and systems for selection of reviews and content from reviews for presentation.

BACKGROUND

Many Internet users research a product or a service before obtaining it. Many Internet users also research a provider of products or services before patronizing that provider. Currently, an approach that many users follow is to use Web sites that provide ratings and reviews for products, services and/or providers thereof. For example, Web sites such as www.pricegrabber.com, www.bizrate.com, and www.resellerratings.com provide ratings and reviews for products and providers thereof.

To get a holistic view of the reviews and ratings for a product, service, or provider, a user may visit a number of Web sites that provide reviews and ratings and read a number of the ratings and reviews provided by those Web sites. However, this process is fairly time-consuming and cumbersome. Users may be content with a simple summary of the ratings and reviews, in order to avoid spending the time sifting through reviews and ratings on various Web sites.

Thus, it would be highly desirable to enable users to more efficiently conduct research on the products and services they are interested in obtaining (e.g., by purchase, lease, rental, or other similar transaction) and on the providers of products and services they are interested in patronizing.

SUMMARY OF EMBODIMENTS

In some embodiments of the invention, a method of processing reviews includes identifying a review, partitioning the review into one or more partitions, selecting a subset of the partitions based on predefined criteria, generating a snippet including content from the selected subset, and generating a response including the snippet.

BRIEF DESCRIPTION OF THE DRAWINGS

Like reference numerals refer to corresponding parts throughout the drawings.

DESCRIPTION OF EMBODIMENTS

Users who conduct research on a subject (such as a product, service, or provider thereof) may not want to spend time reading numerous reviews and ratings across several Web sites and may be content with a summary of the reviews and ratings for the subject. The summary may include a sample of reviews for the subject. However, merely choosing reviews at random for inclusion in the sample is not very helpful to the user. The disclose embodiments select reviews for inclusion in a reviews sample based on predefined, non-random criteria and selects text from a review for use in a snippet of the review.

Figure 1:
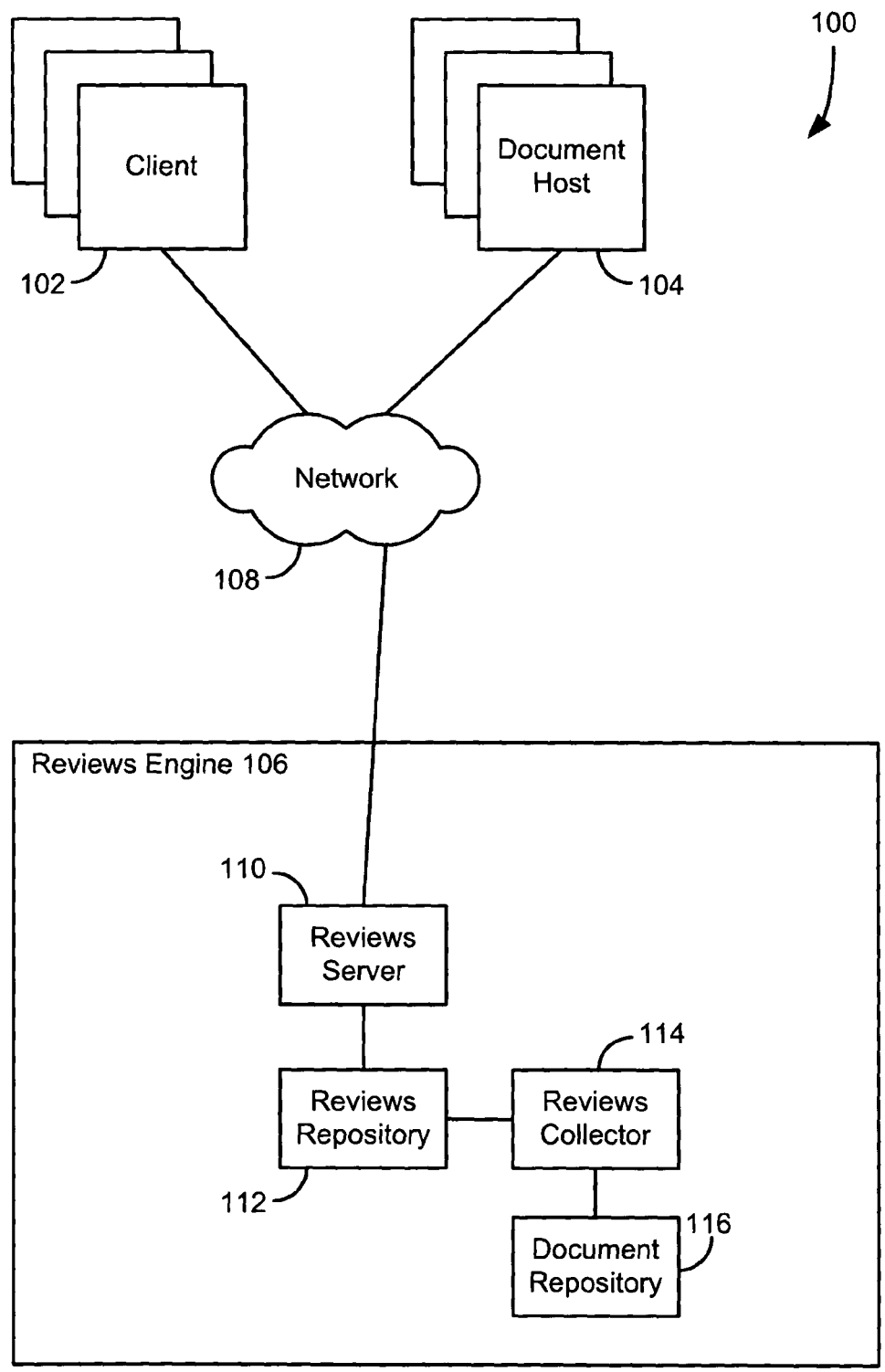
FIG. 1 illustrates a network, according to some embodiments of the invention.

FIG. 1 illustrates a network, according to some embodiments of the invention. The network 100 includes one or more clients 102, one or more document hosts 104, and a reviews engine 106. The network 100 also includes a network 108 that couples these components.

The document hosts 104 store documents and provide access to documents. A document may be any machine-readable data including any combination of text, graphics, multimedia content, etc. In some embodiments, a document may be a combination of text, graphics and possible other forms of information written in the Hypertext Markup Language (HTML), i.e., web pages. A document may include one or more hyperlinks to other documents. A document stored in a document host 102 may be located and/or identified by a Uniform Resource Locator (URL), or Web address, or any other appropriate form of identification and/or location. The document hosts 104 also store reviews submitted to them by users and provide access to the reviews via documents such as web pages.

The clients 102 include client applications from which users can access documents, such as web pages. In some embodiments, the client applications include a web browser. Examples of web browsers include Firefox, Internet Explorer, and Opera. In some embodiments, users can also submit reviews to document hosts 104 or the reviews engine 106 via the clients 102.

A review includes content (e.g., comments, evaluation, opinion, etc.) regarding a subject or a class of subjects. In some embodiments, the content is textual. In other embodiments, the content may also include audio, video, or any combination of text, audio, and video.

The subject of a review is a particular entity or object to which the content in the review provides comments, evaluation, opinion, or the like. In some embodiments, a subject of a review may be classified according to the type of subject. Examples of subject types include products, services, providers of products, providers of services, and so forth. A review may be directed to a class of subjects. A class of subjects includes a plurality of particular entities or objects that share a common trait, characteristic, or feature. For example, a particular product line may be a class of subjects that may be the subject of a review. As another example, all products having a particular brand may be a class of subjects that may be the subject of a review.

A rating may be associated with a review and stored along with the review. The rating (or "rating score") represents a score, on a predefined scale, for the subject (or class of subjects) of the review. The format of a rating may be a numerical value or any non-numerical format that can be mapped to a numerical value. For example, the non-numerical thumbs-up or thumbs-down ratings may be mapped to binary values 1 or 0, respectively. Examples of forms of ratings include symbolic or descriptive formats (positive/negative, thumbs-up/thumbs-down, and the like) and numerical formats (1-3, 1-5, 1-10, 1-100, and the like). In some embodiments, in addition to the rating, a review may also be associated with sub-ratings for particular aspects of the subject. The sub-ratings may be scores for particular aspects of the subject.

The reviews engine 106 includes a reviews server 110, a reviews repository 112, and a reviews collector 114, and a document repository 116. The reviews server 110 generates responses that include reviews and/or snippets of reviews for transmission to the clients 102. The reviews server 110 also provides an interface to users of clients 102 for the submission of reviews and ratings to the reviews engine 106.

The reviews collector 114 collects reviews from documents. The reviews collector 114 parses documents and extracts the reviews, ratings, and other pertinent information (such as authors of the reviews, dates of the reviews, subjects of the reviews, etc.) from the documents. The extracted reviews are transmitted to the reviews repository 112 for storage. The documents from which the reviews collector 114 extracts reviews may be stored in the document hosts 104 and/or the document repository 116.

The document repository 116 is a store of copies of at least a subset of the documents stored in document hosts 104. The documents stored in the document repository 116 may be collected from document hosts 104 and stored there by the reviews engine 106. In some embodiments, the document repository 116 may be located at a search engine (not shown) that is accessible to the reviews engine 106, and the search engine is responsible for collecting documents from document hosts 104 and storing them in the document repository 116.

The reviews stored in the reviews engine 106 are written by users of clients 102 and submitted to document hosts 104 or the reviews engine 106. The reviews that are submitted to document hosts 104 may be extracted from documents stored at document hosts 104 or copies of the documents that are stored in the document repository 116. Reviews may also be submitted to the reviews engine 106 by users. Both reviews extracted from documents and reviews submitted to the reviews engine 106 are transmitted to the reviews repository 112 for storage.

The document hosts 104 or the reviews engine 106 may provide the ability for users to submit reviews to them. For example, the document hosts 104 or the reviews engine 106 may provide online forms that the users can fill with their reviews and ratings and then submit. The reviews, after submission and storage, may be accessed by other users through documents such as web pages.

The source of a review is the entity to which the review was submitted. The source may be identified by the location and/or identifier of the document host 104 to which the review was submitted. In some embodiments, the source of a review may be identified by the domain of the document host 104 to which the review was submitted. For example, if a review was submitted to a document host under the domain "www.xyz.com," then the source of the extracted review may be "xyz.com." In the case of reviews submitted to the reviews engine 106 by users, the reviews engine 106 may be considered as the source.

The reviews repository 112 stores reviews and associated ratings. The reviews repository 112, also stores the subject or class of subjects and the subject type (i.e., whether the subject or class of subjects is a product, product provider, etc.) for each review. The reviews repository 112 may also store the source, the author, and the date for each review. In some embodiments, a review and rating may be associated, in the reviews repository 112, with one or more evaluations of the review and rating itself. An evaluation of the review and rating may evaluate the helpfulness and/or trustworthiness of the review and rating. For example, the evaluation of the review and rating may include a helpful/unhelpful rating. As another example, the review and rating may be associated with a metric value that is based on a measure of the reputation of its author. An example of a reputation-based metric value is disclosed in U.S. patent application Ser. No. 11/241,693, "Systems and Methods for Reputation Management," filed Sep. 30, 2005, the disclosure of which is hereby incorporated by reference.

It should be appreciated that each of the components of the reviews engine 106 may be distributed over multiple computers. For example, the reviews repository 112 may be deployed over M servers, with a mapping function such as the "modulo M" function being used to determine which reviews are stored in each of the M servers. Similarly, the reviews server 110 may be distributed over multiple servers, and the reviews collector 114 and the document repository 116 may each be distributed over multiple computers. However, for convenience of explanation, we will discuss the components of the reviews engine 106 as though they were implemented on a single computer.

Figure 2:
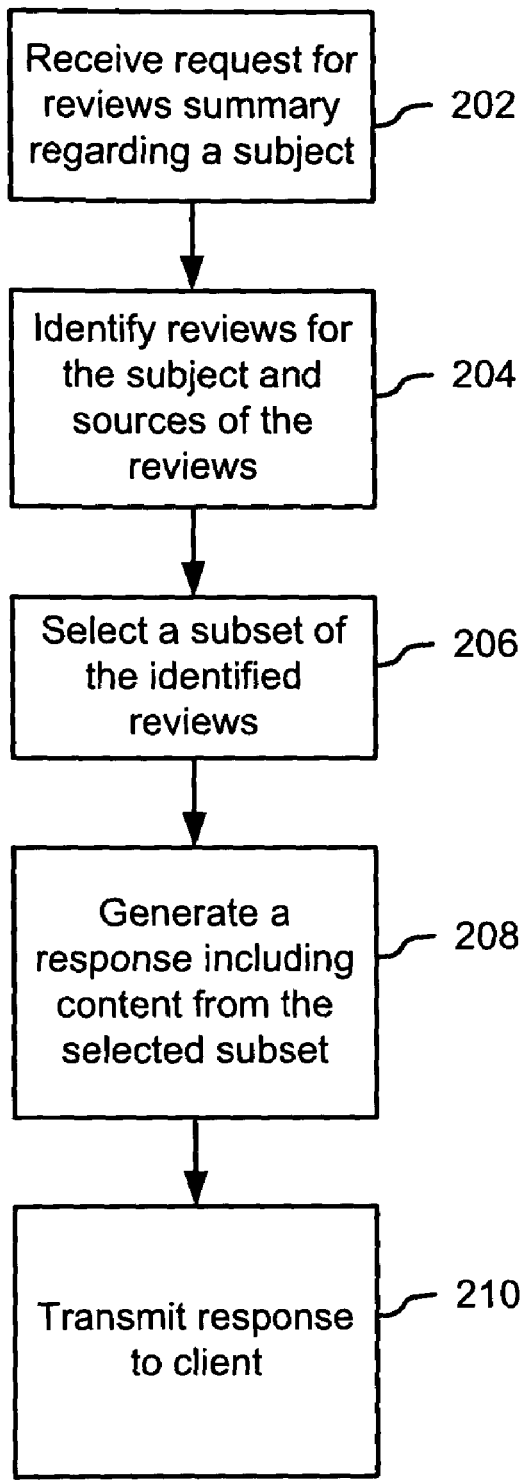
FIG. 2 is a flow diagram of a process for receiving and responding to requests for review summaries, according to some embodiments of the invention.

FIG. 2 is a flow diagram of a process for receiving and responding to requests for review summaries, according to some embodiments of the invention. The reviews engine 106, as described above, collects and stores reviews submitted to document hosts 104, as well as reviews submitted to the reviews engine 106 by users. Users may request from the reviews engine reviews information for a subject, such as a product, service, or provider, through a client 102. For example, the user may click on a link, in a web page displayed on client 102, which triggers transmission of a request to the reviews engine 106. An exemplary process for handling such a request is described below.

Via clients 102, a user may request, from the reviews engine 106, a reviews summary for a subject or a class of subjects. The reviews engine 106 receives a request from a client 102 for a reviews summary for a subject (202). Reviews for the subject that are stored in the reviews repository 112 are identified (204). A subset of the identified reviews is selected (206). A response including content from the selected subset is generated (208). The response is transmitted to the client 102 (210). The client 102, upon receiving the response, renders the response in a client application, such as a web browser, for presentation to the user.

The generated response is a document that is transmitted to a client 102 for rendering and presentation to a user. The response document may include a review summary for the subject. The reviews summary includes information such as the overall rating for the subject, further details of which are described below in relation to FIG. 3. The review summary may also include collective ratings for the subject given by review sources, if available. The collective rating, given to the subject by a review source, is a rating that is determined by the review source based on the ratings associated with reviews for the subject submitted to that source. How the collective rating is determined may vary by review source, but that is not of concern here. Not all review sources may have a collective rating for the subject due to various reasons. For example, some review sources may decide not to have collective ratings at all, while other review sources may require that the number of ratings for the subject reach a predefined minimum before a collective rating is determined and given. Inclusion of the collective ratings in the reviews summary is optional.

The reviews summary also includes a reviews sample. In some embodiments, the reviews sample may include the full contents of at least some of the selected reviews. For text-based reviews, the full content of a review is the entire text of the review. For video based reviews, the full content of a review is the full video clip of the review. In some other embodiments, the reviews sample may include snippets of at least some of the selected reviews, further details of which are described below, in relation to FIG. 6. It should be appreciated, however, that in some embodiments the reviews sample may include both the full content of some selected reviews and snippets of other selected reviews. The review sample may also include one or more links to the sources of the reviews for which the full contents or snippets are included in the reviews sample.

Figure 3:
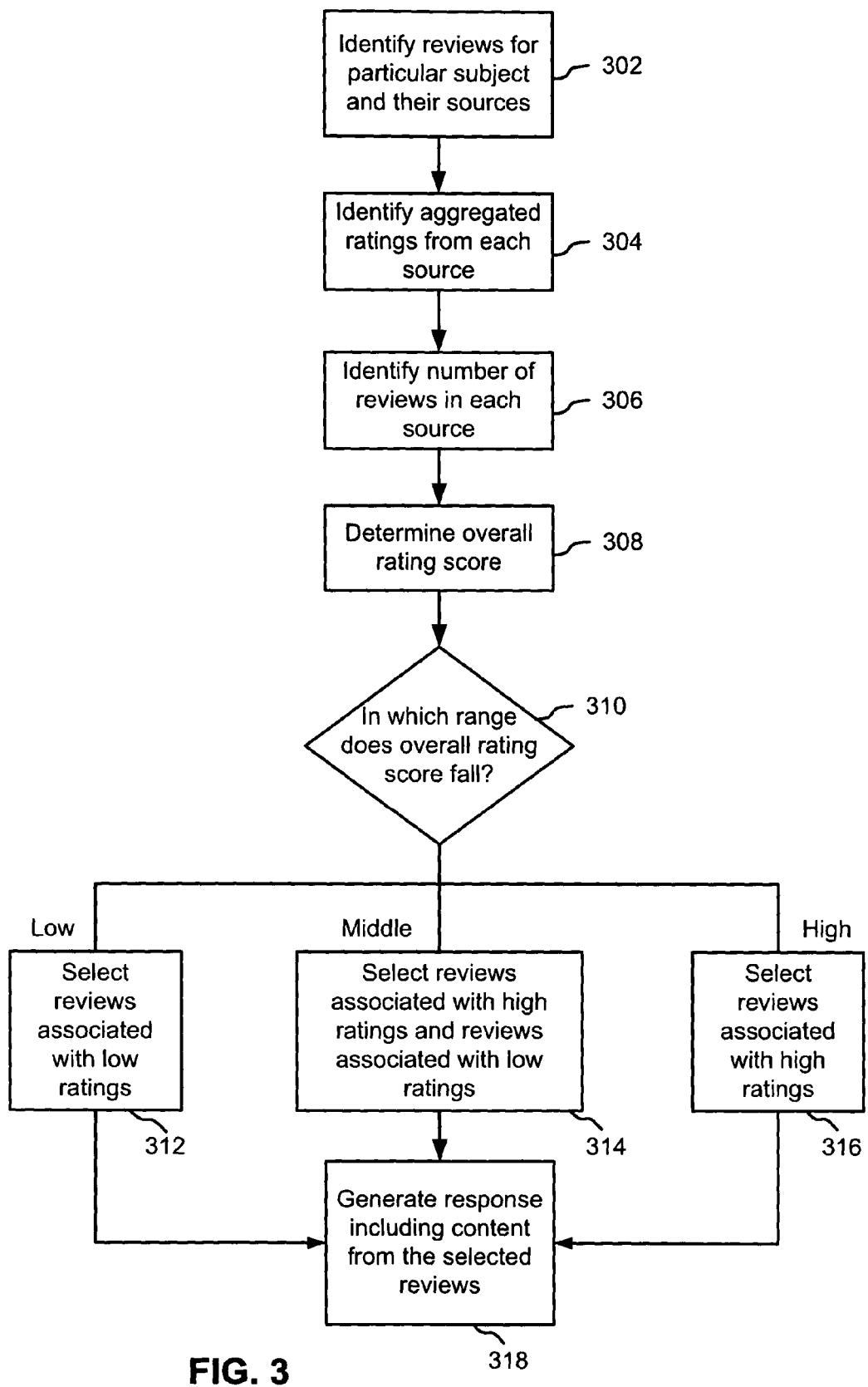
FIG. 3 is a flow diagram of a process for selecting representative reviews, according to some embodiments of the invention.

FIG. 3 is a flow diagram of a process for selecting representative reviews, according to some embodiments of the invention. Upon receiving a request from a user for a reviews summary for a subject, the reviews engine 106 can select a number of reviews for inclusion in a reviews sample of a subject, such that the reviews in the sample are representative of the overall rating for the subject.

Reviews for a particular subject and the sources of the reviews are identified (302). The reviews may be identified from the reviews repository 112 by searching the reviews repository 112 for all reviews associated with the particular subject. The identified reviews form a corpus of reviews for the particular subject. The collective ratings for the subject are identified from each identified source, if available (304). For each identified review source, the number of reviews in the corpus that are in the respective source is identified (306). This is simply a count of how many reviews in the corpus are included in each source.

An overall rating score is determined for the subject (308). The overall rating score may be a mathematical combination of the collective ratings for the subject given by the review sources. In some embodiments, the overall rating score is a weighted average of the collective ratings. The weights are based on the number of reviews in the corpus that are included in each source. Thus, the collective ratings from sources with more reviews in the corpus are favored in the weighted average. An exemplary formula for calculating the overall rating is:

$$OR = \frac{\sum_{i=1}^{S} r_i \log n_i}{\sum_{i=1}^{S} \log n_i}$$

where OR is the overall rating, S is the number of review sources that has at least one review in the corpus (i.e., at least one review for the subject) and an aggregated rating for the subject, $r_i$ is the collective rating from source i, and $n_i$ is the number of reviews in the corpus that is in source i. If the review sources each use different scales and/or forms for their collective ratings, the collective ratings are first converted and/or normalized to the same scale and form as the scale/form used for the overall rating. In some embodiments, the overall rating is based on a 1-5 numerical rating scale, and thus the collective ratings are converted and/or normalized to that scale. It should be appreciated, however, that alternative rating scales may be used for the overall rating. In some embodiments, the collective ratings are weighted by the logarithms of the numbers of reviews in the corpus that are in each review source, as shown in the formula above. The logarithm may be in any suitable base, such as base 2, base 10, or base e. In some other embodiments, the collective ratings are weighted by the numbers of reviews in the corpus that are in each review source, as shown in the formula:

$$OR = \frac{\sum_{i=1}^{S} r_i n_i}{\sum_{i=1}^{S} n_i}$$

Upon determining the overall rating, a rating range in which the overall rating falls is identified (310). A rating scale may be divided into two or more rating ranges. For example, a 1-5 scale may be divided into 3 ranges. A rating between 3.66 and 5, inclusive, may indicate that experience with the subject has been positive overall. A rating between 1 and 2.33, inclusive, may indicate that experience with the subject has been negative overall. A rating between 2.34 to 3.65, inclusive, may indicate that experience with the subject has been mixed overall. As another example, the same 1-5 scale may be divided into four ranges. A rating between 4.1 and 5, inclusive, may indicate an excellent rating. A rating between 3.1 and 4, inclusive, may mean a good rating. A rating between 2.1 to 3, inclusive, may mean a fair rating. A rating between 1 and 2, inclusive, may mean a poor rating. It should be appreciated that the rating range examples above are merely exemplary and alternative manners of dividing a rating scale may be used. However, for convenience of explanation, we will discuss the process illustrated in FIG. 3 as if the rating scale was divided into three ranges: a high/positive range, a low/negative range, and a middle/mixed range.

If the overall rating falls in the low range (310—low), reviews in the corpus that are associated with ratings in the low range are selected (312). Reviews may be selected on a per source basis or selected from the corpus as a whole. If reviews are selected on a per source basis, up to a first predefined number of reviews associated with ratings in the low range may selected from each source. If the reviews are selected from the corpus as a whole, up to a second predefined number of reviews may be selected from the corpus, without regard to the review source.

If the overall rating falls in the middle range (310—middle), reviews in the corpus that are associated with ratings in the high range and reviews in the corpus that are associated with ratings in the low range are selected (314). In other words, amongst the selected reviews are reviews associated with ratings in the high range and reviews associated with ratings in the low range. In alternative embodiments, reviews in the corpus that are associated with ratings in the middle range are selected. As described above, the reviews may be selected on a per source basis or from the corpus as a whole.

If the overall rating falls in the high range (310—high), reviews in the corpus that are associated with ratings in the high range are selected (316). As described above, the reviews may be selected on a per source basis or from the set of reviews as a whole.

In some embodiments, additional selection criteria may be included. For example, an additional criterion may be that the reviews to be selected do not have objectionable content, such as profanity or sexually explicit content. As another example, an additional criterion may be that the reviews to be selected must have a reputation-based metric value that exceeds a predefined threshold. More generally, reviews associated with ratings in the rating range into which the overall rating falls and which also satisfies zero or more other predefined criteria may be selected.

A response including content from the selected reviews is generated (318). The generated response is a document that is transmitted to a client 102 for rendering and presentation to a user. The response document includes the review summary for the subject. The reviews summary may include information such as the overall rating for the subject and optionally the collective ratings for the subject given by the review sources. The reviews summary also includes the reviews sample, which includes at least some of the selected reviews or snippets thereof, as described above.

Figure 4:
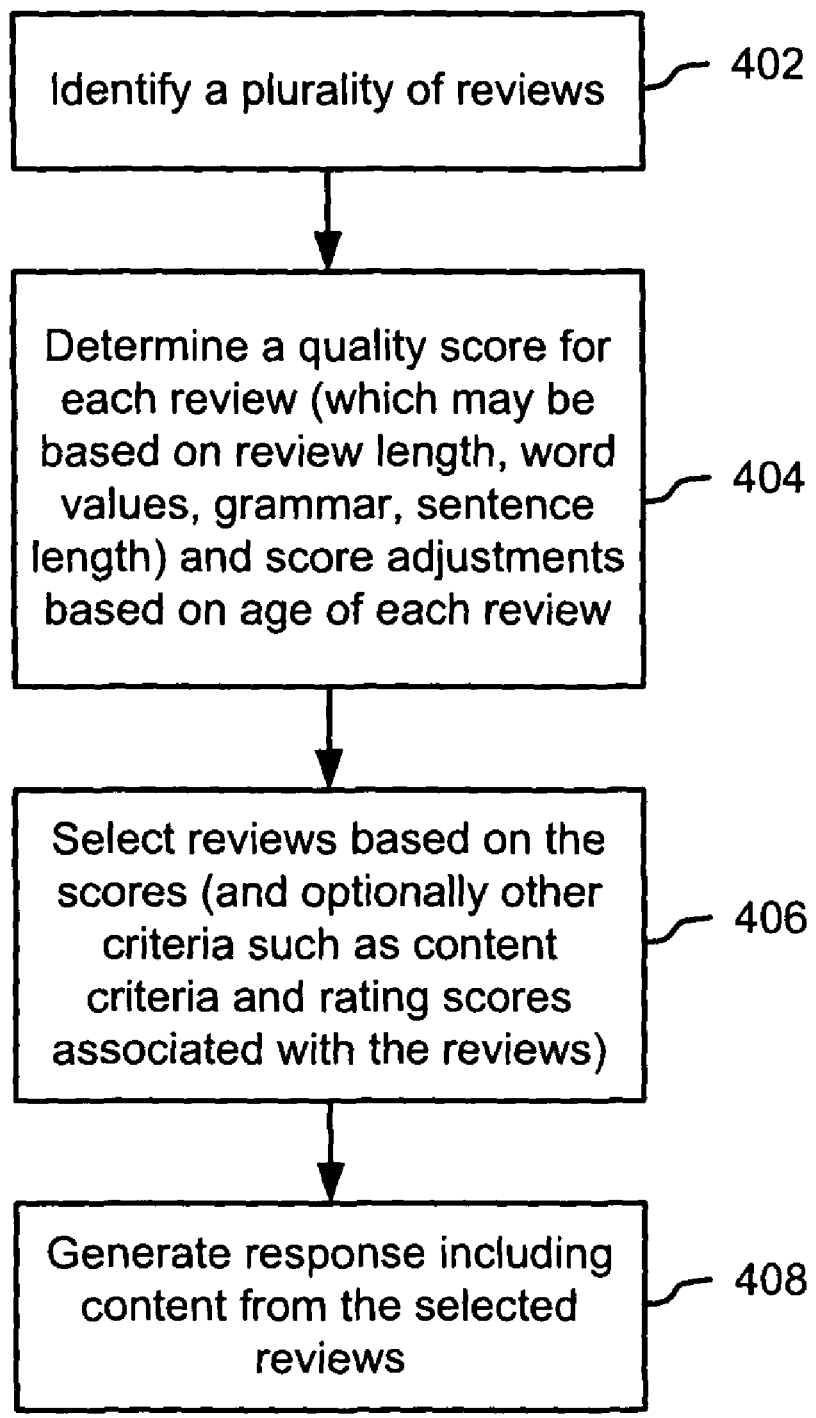
FIG. 4 is a flow diagram of a process for selecting high quality reviews, according to some embodiments of the invention.

FIG. 4 is a flow diagram of a process for selecting high quality reviews, according to some embodiments of the invention. Upon receiving a request from a user for a reviews summary for a subject, the reviews engine 106 can select a number of reviews for inclusion in a reviews sample of a subject, such that the reviews include high quality content.

Reviews for a particular subject and the sources of the reviews are identified (402). The reviews may be identified from the reviews repository 112 by searching the reviews repository 112 for all reviews associated with a particular subject. The identified reviews form a corpus of reviews for the subject. In some embodiments, the initially identified reviews are filtered at 402, or at a later stage of the process, so as to remove any reviews that contain objectionable content.

A quality score is determined for each identified review (404). The quality score is a measure of the quality of the content of the review. The quality score provides a basis for comparing reviews to each other with regard to their quality. The quality score may be based on one or more predefined factors. In some embodiments, the predefined factors include the length of the review, the lengths of sentences in the review, values associated with words in the review, and grammatical quality of the review. A sub-score may be determined for a review based on each factor and the sub-scores combined to determine the quality score for the review. It should be appreciated, however, that additional and/or alternative factors may be included.

With regard to the grammatical quality of the review, reviews that have proper grammar and capitalization (e.g., actually use sentences, review not entirely in uppercase) are favored. Thus, reviews with "proper" grammar and capitalization get higher sub-scores for this factor. Reviews with poor grammar and improper capitalization tend to be less readable. Furthermore, reviews that are entirely in uppercase are often considered to be rude. In some embodiments, detection of sentences in a review may be based on a detection of sentence delimiters, such as periods in the review. In some embodiments, reviews may be evaluated for adherence to additional indicia of grammatical quality, such as subject-verb agreement, absence of run-on sentences or fragments, and so forth. In some embodiments, evaluation of the grammar and capitalization of a review may be performed with the aid of a grammar checker, which is well known in the art and need not be further described.

With regard to the length of the review, reviews that are not too long and not too short are favored. Short reviews (e.g., a few words) tend to be uninformative and long reviews (e.g., many paragraphs) tend to be not as readable as a shorter review. In some embodiments, the review length may be based on a word count. In some other embodiments, the review length may be based on a character count or a sentence count. The review length sub-score may be based on a difference between the length of the review and a predefined "optimal" review length.

In some embodiments, lengths of the sentences in the reviews may also be considered. The reviews engine may prefer sentences of "reasonable" length, rather than extremely long or short sentences. In some embodiments, a sentence length sub-score for a review may be based on the average of the differences between the lengths of the sentences in the review and a predefined "optimal" sentence length.

With regard to values associated with words in the review, reviews with high value words are favored over reviews with low value words. In some embodiments, the word values are based on the inverse document frequency (IDF) values associated with the words. Words with high IDF values are generally considered to be more "valuable." The IDF of a word is based on the number of texts in a set of texts, divided by the number of texts in the set that includes at least one occurrence of the word. The reviews engine 106 may determine the IDF values across reviews in the reviews repository 112 and store the values in one or more tables. In some embodiments, tables of IDF values are generated for reviews of each type. For example, a table of IDF values is generated for all product reviews; a table is generated for all product provider reviews, and so forth. That is, the set of texts used for determining the table of IDF values for product reviews are all product reviews in the reviews repository 112; the set of texts used for determining the table of IDF values for product provider reviews are all product provider reviews in the reviews repository 112, and so forth. Each subject type has its own IDF values table because words that are valuable in reviews for one subject type may not be as valuable in reviews for another subject type.

For any identified review, a frequency for each distinct word in the review is determined and multiplied by the IDF for that word. The word value sub-score for the review is:

$$WV_R = \sum_{w \in R} f_{w,R} \log IDF_w$$

where $WV_R$ is the word value sub-score for review R, $f_{w,R}$ is the number of occurrences (term frequency, or "TF") of distinct word w in review R, and $\log IDF_w$ is the logarithm of the IDF value for word w. The IDF values for words w are taken from a table of IDF values appropriate for the subject type of the review. For example, if the subject of review R is a product, the $IDF_w$ values are taken from the IDF values table for product reviews.

In some other embodiments, word values are based on a predefined dictionary of words that are deemed valuable in a reviews context. Separate dictionaries may be defined for different subject types, as different words may be valuable for use in reviews regarding different subject types. For example, there may be a dictionary of valuable words for reviews where the subject is a product and another dictionary of valuable words for reviews where the subject is a provider. In these embodiments, the word value sub-score may be based on a count of how many of the words in the predefined dictionary are included in the respective review.

The reviews engine 106 evaluates each identified review based on each predefined factor and determines a sub-score for each factor based on its evaluation. The sub-scores for each of the factors may be combined into the quality score using the exemplary formula below:

$$Q = \sum_{j=1}^{F} q_j weight_j$$

where Q is the quality score for the review, F is the number of factors that go into the quality score, $q_j$ is the sub-score for factor j, and $weight_j$ is a weight for factor j. In some embodiments, the weights are all equal to 1, in which case the quality score Q is a sum of the scores for the factors. In some other embodiments, the weights may be defined differently for each factor. In general, the weights may be defined based on the importance of each factor to the quality score and whether a factor is a positive or negative contribution to the quality of the review.

In some embodiments, the age of a review may be considered as a factor in the quality score of a review. In general, newer reviews are favored because they are more reflective of recent experience with the review subject, which are more important than experience in the more distant past. Bonus points that increase the quality score may be applied to the quality score of a review based on the age of the review. For example, a review that is one day old may get an increase in its quality score (either by addition or multiplication), while a review that is a year old gets no bonus.

Reviews are selected based on the quality scores (406). The reviews with the highest quality scores are selected. Reviews may be selected on a per source basis or from the corpus as a whole. If reviews are selected on a per source basis, a number of the highest scoring reviews for each source are selected. For example, the 10 highest scoring reviews may be selected per source. In some embodiments, the selection is performed by sorting the reviews by quality scores and reviews are taken from the highest scoring reviews until the desired number of reviews has been selected.

In some embodiments, predefined content criteria may also be an additional criterion for selecting reviews. With regard to content meeting predefined criteria, the criteria may be defined in order to disfavor reviews with content in the reviews that may offend a user, such as profanity and sexually explicit content; such words and phrases often contribute little or nothing to an understanding of the subject and can make the user who is reading the reviews uncomfortable. Evaluation of a review for content meeting predefined criteria may be performed by defining a dictionary of content commonly associated with offensive or objectionable content and matching content in the review against the dictionary. A review that has objectionable content such as profanity or sexually explicit language is eliminated from consideration for selection. Evaluation of the content of a review for content meeting the predefined content criteria may be done at during the score determination (404) or at review selection (406); when the evaluation is performed is a matter of design choice.

In some embodiments, rating score criteria may be an additional criterion for review selection. For example, the process for selecting representative reviews, as described above may be combined with the current process so that the high quality reviews that are representative of the overall rating of the subject are selected. Thus, reviews that are associated with ratings in the rating range in which the overall rating falls and that have high quality scores may be selected.

It should be appreciated that the additional criteria described above are merely exemplary and that any combination of the above criteria and other criteria may be additional considerations for review selection. More generally, the reviews engine may select the highest scoring (in terms of the quality score) reviews that satisfy zero or more other predefined criteria.

A response including the selected reviews is generated (408). The generated response is a document that is transmitted to a client 102 for rendering and presentation to a user. The response document includes the review summary for the subject. The reviews summary may include information such as the overall rating for the subject and optionally the collective ratings for the subject given by the review sources. The reviews summary also includes the reviews sample, which includes content from the selected reviews, as described above, in relation to FIG. 2.

Figure 5:
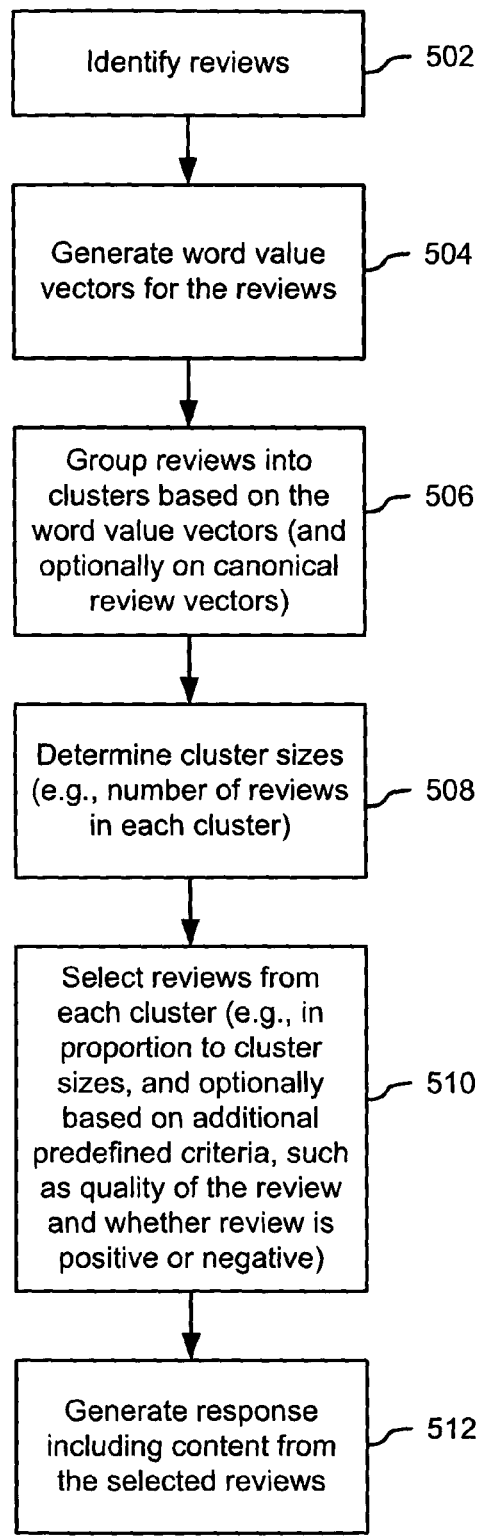
FIG. 5 is a flow diagram of a process for clustering reviews and selecting reviews from the clusters, according to some embodiments of the invention.

FIG. 5 is a flow diagram of a process for clustering reviews and selecting reviews from the clusters, according to some embodiments of the invention. Reviews for a particular subject are identified (502). The reviews may be identified from the reviews repository 112 by searching the reviews repository 112 for all reviews associated with a particular subject. The identified reviews form a corpus of reviews for the subject.

Word value vectors of the reviews are generated (504). The word value vectors include term frequency—inverse document frequency values for words in the reviews. Term frequency—inverse document frequency (also known as "TF-IDF" or "TFIDF") is a technique for evaluating the importance of words in a document, or in the case of these embodiments, in a review. The value of a word with respect to a review increases with the number of times the word appears in the review, but that is offset by the number of reviews in the corpus of reviews that include that word. For any review of a corpus of identified reviews, a vector of word values may be generated. For example, a review R may have the weighting vector:

$$R = [v_1 \ v_2 \ v_3 \ldots v_n]$$

where $v_1$ through $v_n$ are word values, with respect to review T, of all of the distinct words in the corpus of reviews. In some embodiments, a word and its related forms are counted together. For example, the verb tenses of a verb may be counted as occurrence of the same verb, rather than as distinct words merely because the spelling may be different.

A value of a word w with respect to a review R may be determined by the exemplary formula:

$$v_{w,R} = f_{w,R} \log IDF_w$$

where $v_{w,R}$ is the value of a word w with respect to review R, $f_{w,R}$ is the number of occurrences of word w within review R (the term frequency), and $\log IDF_w$ is the logarithm of the IDF value for word w, as described above. If review R does not have word w ($f_{w,R}=0$), the word value $v_{w,R}$ is 0. Word value $v_{w,R}$ can never be negative, as $f_{w,R} \geq 0$ (number of occurrences are never negative) and $\log IDF_w \geq 0$.

Upon generation of word value vectors for each review in the corpus, the reviews in the corpus are organized into clusters based on the word value vectors (506). The word value vectors are embedded in a vector space, in which each word value vector is a "point" in that vector space. The "points" may be grouped into one or more clusters using a clustering algorithm. One exemplary clustering algorithm is the K-means clustering algorithm. The K-means clustering algorithm is well known in the art. However, to facilitate understanding of the disclosed embodiments, the K-means algorithm is described below.

The following pseudocode illustrates the basic steps of the K-means algorithm:

```
Randomly generate k centroids associated with k clusters
Assign each vector to one of the k clusters
Repeat until termination condition met:
    Re-determine cluster centroids
    Reassign each vector to a cluster
```

In the K-means algorithm, an arbitrary number k is predefined. In some embodiments k is a value between 2 and 16, while in some other embodiments k is a value between 2 and 50. K random vectors in the vector space of the word value vectors are generated. The k random vectors are the initial centroids for the vector space. Each initial centroid represents the "center" of a cluster. In other words, k initial clusters and their centers are arbitrarily defined. Each word value vector is assigned to one of the k clusters based on the similarity (distance) between the respective word value vector and each centroid. A word value vector is assigned to the centroid with which it is most similar (shortest distance).

In some embodiments, the similarity (distance) between a word value vector and a centroid is the cosine similarity (also known as "cosine distance"):

$$\cos\theta = \frac{X \cdot Y}{\|X\| \times \|Y\|}$$

where X·Y is the dot product of vectors X and Y, ‖X‖×‖Y‖ is the length of vector X times the length of vector Y, and cos θ is the cosine similarity. If vectors X and Y are exactly the same, the cosine similarity value is 1. The range of values for cosine similarity in these embodiments is between 0 and 1, inclusive (the cosine similarity can never be negative because the word values can never be negative). Thus, reviews with cosine similarity closer to 1 are more similar (shorter distance), while reviews with cosine similarity closer to 0 are more dissimilar (longer distance). In some other embodiments, alternatives manners of determining the distance or similarity may be used.

In some embodiments, a number of predefined canonical reviews may be used as the initial centroids. The canonical reviews are a set of predefined reviews that serve as exemplars of reviews commenting on particular aspects of a subject. The set of canonical reviews may vary, depending on what the subject of the corpus of reviews is. For example, the set of canonical reviews for a subject that is a product, which may include canonical reviews for aspects such as ease of use and performance, may be different than the set of canonical reviews for a subject that is a product provider, which may include canonical reviews for aspects such as customer service and shipping timeliness.

After the word value vectors are assigned to the k clusters, centroids for the k clusters are determined anew. That is, the centroids are re-determined for each cluster. The centroid for a cluster may be determined by taking the "average" of the word value vectors in the cluster (not including the initial centroid; the initial centroid is relevant for only the initial cluster assignment). The formula for determining a centroid C is:

$$C = \frac{\sum_{i=1}^{CS} V_i}{CS}$$

where CS is the size of the cluster (number of word value vectors in the cluster), and $V_i$ are normalized (converted to vectors of unit length) vectors of the word value vectors in the cluster.

Upon determination of the new centroids, the word vector values are reassigned into clusters, this time based on the similarity to the new centroids. A word value vector is assigned to the centroid to which it is most similar. After each word value vector is reassigned to a cluster, the iteration of re-determining the centroids and re-assigning the word value vectors repeat. The iteration repeats until a termination condition is met. In some embodiments, the termination condition is when a convergence criterion is met. The convergence criterion may be that no word value vectors are reassigned to a different cluster after the completion of an iteration. In some other embodiments, the termination condition is that a predefined number of iterations have been performed.

It should be appreciated that alternative manners of clustering, such as hierarchal clustering, the fuzzy c-means algorithm, and others, may be used.

Upon grouping the reviews into clusters, the sizes of the review clusters are identified (508). This is simply the number of reviews (represented by the word value vectors, not including the centroid) in each cluster.

Reviews are selected from each cluster (510). In some embodiments, reviews are selected from each cluster in proportion to the cluster sizes. A predefined total number of reviews are selected from the corpus of reviews to serve as a sample of the corpus of reviews. The reviews in the sample are selected from the clusters in proportion to the sizes of the clusters. The sample would have more reviews selected from a larger cluster than a smaller cluster. In some embodiments, a cluster that is extremely small (for example, less than a predefined number of reviews or less than a predefined percentage of the number of total reviews in the corpus) may be excluded from the review selection; no review from that cluster will be selected for inclusion in the sample. If a cluster is excluded, then one or more reviews may be selected from other clusters so that the number of reviews in the sample reaches the predefined total number.

In some embodiments, reviews may be selected from a cluster based on additional predefined criteria. For example, reviews may be selected from a cluster based on the quality of the reviews, as described above, in relation to FIG. 4. Reviews of high quality are generally more informative and easier to read than reviews of low quality. Thus, for example, if 10 reviews are to be selected from a cluster, then with the additional quality criterion, the 10 highest quality reviews from that cluster may be selected. As another example, reviews may be selected from a cluster based on the ratings associated with the reviews, such as the selection process described above, in relation to FIG. 3. More generally, as long as a cluster contributes to the review sample a number of reviews that is proportional to the cluster size, reviews from that cluster may be selected based on zero or more predefined criteria.

A response that includes the selected reviews is generated (512). The generated response is a document that is transmitted to a client 102 for rendering and presentation to a user. The response document includes the review summary for the subject. The reviews summary may include information such as the overall rating for the subject and optionally the collective ratings for the subject given by the review sources. The reviews summary also includes the reviews sample, which includes content from the selected reviews, as described above, in relation to FIG. 2.

By clustering reviews and selecting reviews from the clusters, a review sample that is representative of the topical focus of the reviews is selected. Clustering helps the reviews engine identify reviews that focus on particular aspects of a subject. By separating the reviews by the aspect upon which the review focuses (into the clusters) and selecting reviews from the clusters for inclusion in a reviews sample, a user, upon being shown the reviews sample, can get a better understanding of which aspects of the subject are particularly noteworthy or were of particular concern to other users who have had experience with the subject.

Figure 6:
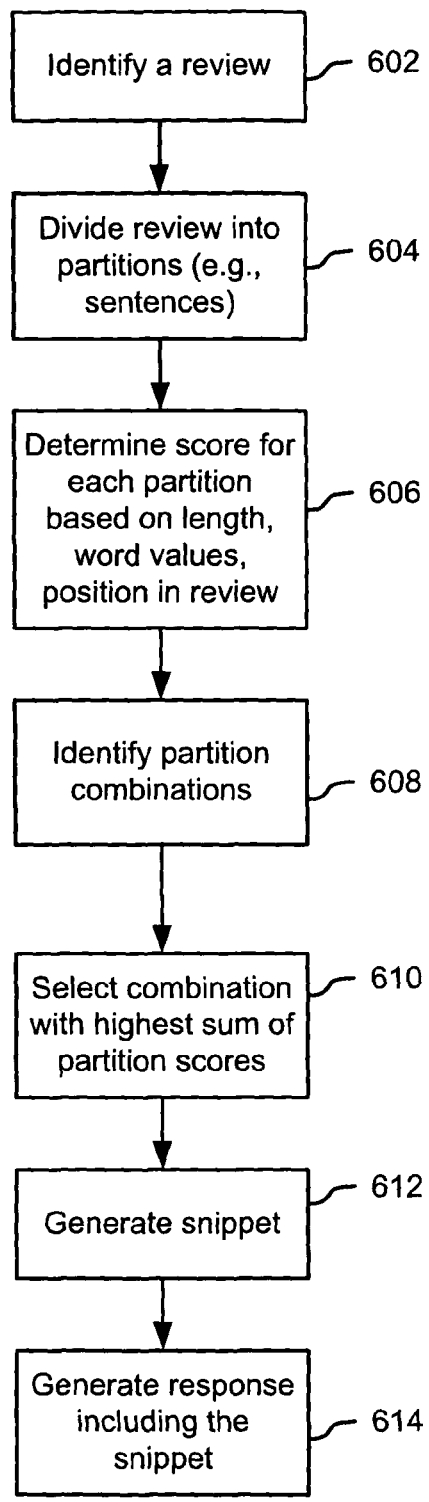
FIG. 6 is a flow diagram of a process for generating a snippet from high quality content within a review, according to some embodiments of the invention.

FIG. 6 is a flow diagram of a process for generating a snippet from high quality content within a review, according to some embodiments of the invention. To save time, a user may prefer to read only parts of reviews rather than the full content of reviews. The reviews engine may select particular content within reviews for inclusion in the reviews sample as review snippets.

A review is identified (602). The identified review is divided into partitions (604). In some embodiments, the partitions are the sentences of the review. That is, each sentence of the review is a partition of the review. Sentences in the review may be identified based on sentence delimiters such as periods. It may be the case that a review may only have one partition, such as when the review has only one sentence. For convenience of explanation, the process of FIG. 5 will be described below as if the partitions of reviews are the sentences of the reviews. It should be appreciated, however, that alternative manners of partitioning a review (such as partitions of Z words, where Z is a predefined whole number) may be used.

A quality score is determined for each sentence of the review (606). The quality score for a review sentence is similar to the quality score for a review, as described above in relation to FIG. 4. The sentence quality score provides a basis for a relative ordering of the sentences of a review with regard to their quality. The quality score may be based on one or more factors. A sub-score may be determined based on each of the factors. The sub-scores may be combined into the quality score for a sentence, using the weighted sum equation similar to that described in relation to FIG. 3 above. In some embodiments, the predefined factors include the length of the sentence, values associated with words in the sentence, and the position of the sentence within the review.

With regard to the length of a review sentence, sentences that are not too long and not too short (i.e., sentence of "reasonable length") are favored. Extremely short sentences may not include much information and extremely long sentences may be difficult to read. In some embodiments, a sub-score based on sentence length may be based on the deviation of the sentences in the review from a predefined "optimal" sentence length. The sentence length may be based on a word count or a character count.

With regard to values associated with words in the sentence, sentences with high value words are favored over sentences with low value words. In some embodiments, the word values are based on the inverse document frequency (IDF) values associated with the words, similar to the word value factor used in scoring reviews, described above in relation to FIG. 4. For a sentence, a frequency for each distinct word in the sentence is determined and multiplied by the IDF for that word. The word value sub-score for the review is:

$$WV_P = \sum_{w \in P} f_{w,P} \log IDF_w$$

where $WV_P$ is the word value sub-score for sentence P, $f_{w,P}$ is the number of occurrences of word w in sentence P, and log $IDF_w$ is the logarithm of the IDF value for word w.

In some other embodiments, word values are based on a predefined dictionary of words that are deemed valuable in a reviews context. Separate dictionaries may be defined for different subject types, as different words may be valuable for use in reviews regarding different subject types. For example, there may be a dictionary of valuable words for reviews where the subject is a product and another dictionary of valuable words for reviews where the subject is a provider. In these embodiments, the word value sub-score may be based on a count of how many of the words in the predefined dictionary are included in the respective sentence.

With regard to the position of the sentence within the review, in some embodiments the reviews engine may favor sentences that occur in the beginning of the review. Thus, a sub-score based on position may be based on the position of the sentence in the review, normalized for the number of sentences in the review. For example, for the 4th sentence of a review with 10 sentences, the position sub-score for that sentence may be 4/10=0.2.

Upon determination of the sub-scores for a sentence, the sub-scores may be mathematically combined into a quality score for the sentence, using the formula similar to that described above, in relation to FIG. 4.

Combinations of the review sentences are identified (608). Each combination includes one or more consecutive sentences of the review that satisfies predefined length criteria. In some embodiments, the length criteria are that the length of the combination is equal to a predefined maximum snippet length (which may be based on a word count or a character count) or exceeds the maximum snippet length by a portion of the last sentence in the combination. An exemplary algorithm for identifying the combinations is illustrated by the pseudocode below:

```
For each sentence i in the review:
    integer j = i
    combination i = sentence j
    while (length(combination i) < max_snippet_length)
        combination i = combination i + sentence (++j)
```

As illustrated in the pseudocode above, the combination starts out as one sentence in the review, and subsequent sentences are appended to the combination, up to and including the first sentence that makes the length of the combination equal to or greater than the maximum snippet length. Thus, a combination is a concatenation of as many consecutive sentences of the review as possible without making the length of the combination exceed the maximum snippet length, plus possibly one additional sentence that, when added to the combination, makes the length of the combination equal to or greater than the maximum snippet length.

In some other embodiments, the algorithm may be refined to also consider how much of the sentence to be appended will be within the maximum snippet length, i.e., how much "space" remains in the combination to accommodate an additional sentence. For example, it may be more worthwhile to not append an additional sentence to a combination when the combination is only one or two words short of the maximum snippet length.

A combination with the highest combined quality score is selected (610). In some embodiments, the combined quality score for a combination is a simple sum of the quality scores of the sentences within the combination. In some other embodiments, the combined quality score may be a weighted sum, simple average, or weighted average of the quality scores of the sentences within the combination.

A snippet is generated using the selected combination (612). The snippet includes the selected combination, up to the maximum snippet length. If the combination exceeds the maximum snippet length, content is truncated from the end of the combination until the length of the combination is equal to the maximum snippet length. In some embodiments, the combination may be truncated to be shorter than the maximum snippet length if only a small part (e.g., one or two words) of the last sentence in the combination remains after the truncation to the maximum snippet length. In other words, it may be more worthwhile to truncate by removing the last sentence in the combination if only a few words of that sentence will remain after truncating the combination to the maximum snippet length.

A response including the snippet is generated (614). The generated response is a document that is transmitted to a client 102 for rendering and presentation to a user. The response document includes the review summary for the subject. The reviews summary may include information such as the overall rating for the subject and optionally the collective ratings for the subject given by the review sources. The reviews summary also includes the reviews sample, which includes content from the selected reviews, as described above, in relation to FIG. 2.

Reviews engine 106 selects reviews from its reviews repository and generates a response including content from the selected reviews (such as full reviews and/or snippets) for transmission to a client 102. FIGS. 3, 4, and 5 illustrate three processes for selecting reviews for the sample. FIG. 6 illustrates a process for generating a snippet of a review, which may be a review selected in the processes of FIGS. 3, 4, and/or 5. It should be appreciated that the processes above may be combined. For example, the reviews engine 106 may select a number of reviews that correspond to the rating range into which the overall score falls and have high quality scores. As another example, the reviews engine 106 may cluster reviews for a subject and select from each cluster, in proportion to the cluster sizes, reviews that correspond to the rating range into which the overall score falls and have high quality scores. Snippets of these selected reviews are generated and a response including the snippets is generated. More generally, reviews may be selected based on one or more predefined criteria and snippets of these reviews may be generated and included in a response sent to the client 102.

Figure 7:
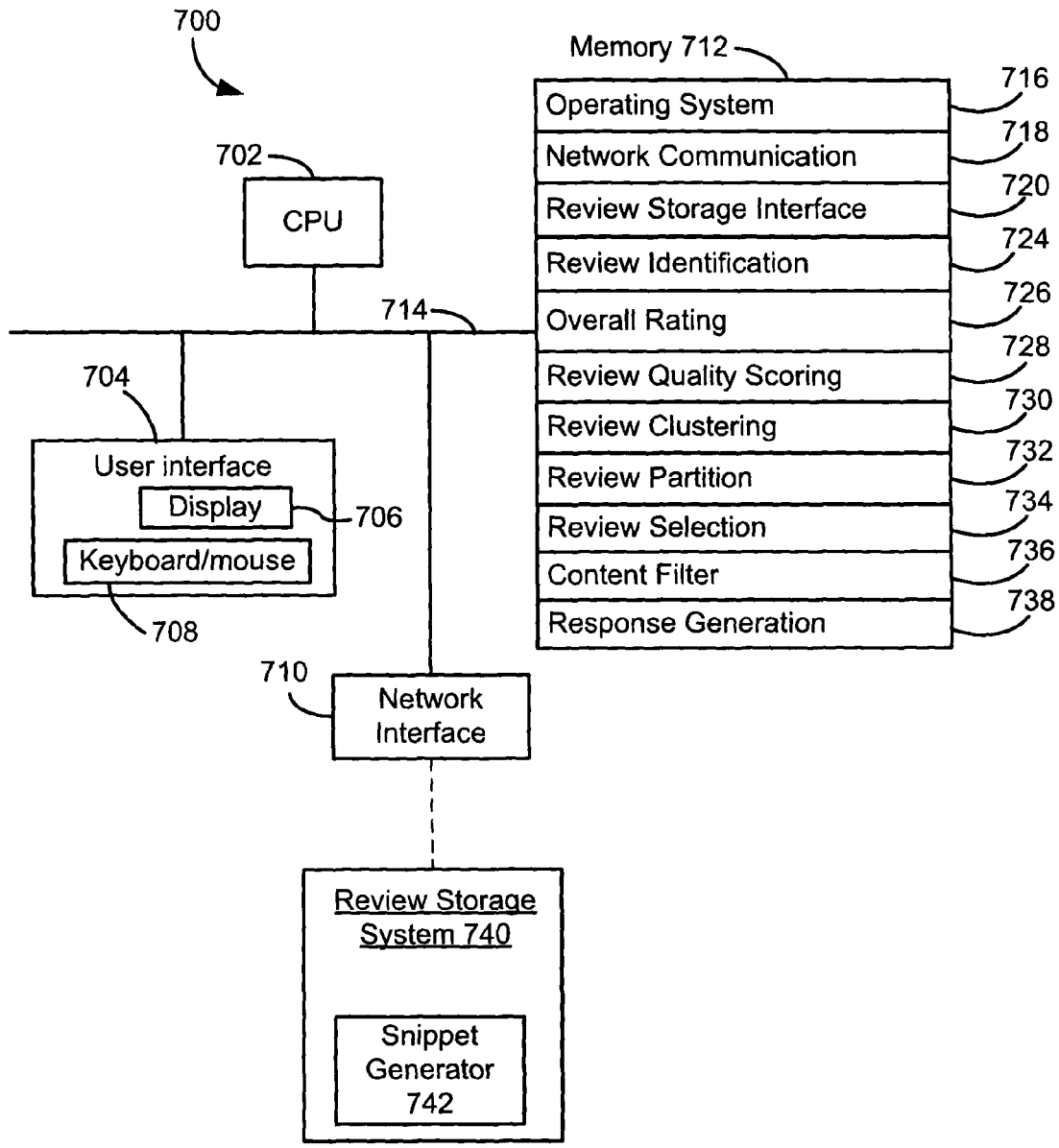
FIG. 7 illustrates a system for processing reviews, according to some embodiments of the invention.

FIG. 7 is a block diagram illustrating a reviews processing system 700, according to some embodiments of the invention. The system 700 typically includes one or more processing units (CPU's) 702, one or more network or other communications interfaces 710, memory 712, and one or more communication buses 714 for interconnecting these components. The system 700 optionally may include a user interface 704 comprising a display device 706 and a keyboard/mouse 708. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or one or more of the storage devices (e.g., one or more non-volatile storage devices) in memory 712, includes a computer readable storage medium. In some embodiments, memory 712 or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the reviews processing system 700 to other computers via the one or more communication network interfaces 710 (wired or wireless), such as the Internet, other wide area networks, local area networks, metropolitan area networks, and so on;
- a review storage interface 720 that interfaces with a review storage system;
- a source identification module 722 that identifies sources of reviews;
- a review identification module 724 that identifies reviews and associated ratings from review sources;
- an overall rating module 726 that determines an overall rating for a subject and determining which rating range the overall rating falls under;
- a review quality scoring module 728 that determines quality scores for reviews;
- a review clustering module 730 that organizes reviews into clusters;
- a review partition module 732 that divides reviews into partitions, determines quality scores for the partitions, identifies combinations of partitions, and selects the combination with the highest combined quality score;
- a review selection module 734 that selects reviews based on one or more predefined criteria;
- a content filter 736 that evaluates reviews and review partitions for content satisfying predefined content criteria, such as objectionable content; and
- a response generation module 738 that generates responses that include reviews and/or snippets of reviews.

The system 700 also includes a review storage system 740. The review storage system 740 stores reviews and associated ratings. The review storage system 740 includes a snippet generator 742 that generates snippets of reviews. In some embodiments, the snippet generator 742 may be located in memory 712, rather than in the review storage system 740.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "reviews processing system," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a reviews processing system and how features are allocated among them will vary from one implementation to another, and may depend in part on the amount of data traffic that the system must handle during peak usage periods as well as during average usage periods.

It should be appreciated that the description above are not limited in their application to reviews that are purely textual, i.e., consisting of strings of characters. The description is capable of adaptation to reviews that includes audio, video, or other forms of media. For example, for a review that includes audio (such as audio-only reviews or a video reviews with an audio track), the audio may be converted to text using speech to text conversion, which are well known in the art. The converted text may be used as the "review" for the selection and snippet generation processes described above. The snippet of an audio or video review would the portion of the audio or video that has the speech with the words that were selected for a snippet based on the converted text of the review. If review quality is a criterion for selecting audio/video reviews, the grammatical quality factor may be adapted for the medium. For example, capitalization is not very relevant when the content of the review is verbal rather than textual, and thus can be disregarded.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method of generating a review sample of a single review in a corpus of reviews, comprising:
at a server having one or more processors and memory storing one or more programs for execution by the one or more processors:
identifying the single review;
partitioning the review into partitions;
selecting a plurality of the partitions of the single review based on predefined criteria, wherein selecting the plurality of the partitions comprises: identifying two or more combinations of the partitions, determining a quality score for each respective combination, and selecting the respective combination having a highest quality score;
generating a snippet solely for the single review including content from each of the selected plurality of the partitions, wherein the review sample of the single review comprises the generated snippet; and
generating a response including the snippet for the single review.

2. The method of claim 1, wherein selecting comprises:
determining a quality score for each of the partitions; and
selecting a plurality of the partitions of the single review based on the quality scores.

3. The method of claim 2, wherein determining comprises determining a quality score for each of the partitions based on a length of the respective partition and at least one of the group consisting of: inverse document frequency values associated with one or more words in the respective partition, and a position of the respective partition within the review.

4. The method of claim 1, wherein selecting comprises:
determining a quality score for each of the partitions; and
selecting a plurality of the partitions based on a combined quality score that is based on the quality scores.

5. The method of claim 1, including limiting a length of the selected plurality of the partitions so that the length of the selected plurality of the partitions exceeds a predefined maximum snippet length by less than a full sentence.

6. A computer implemented method of processing reviews, comprising:
at a server having one or more processors and memory storing one or more programs for execution by the one or more processors:
identifying a single review;
partitioning the review into one or more partitions;
selecting a plurality of the partitions based on predefined criteria;
generating a snippet solely for the single review including content from the selected plurality of the partitions; and
generating a response including the snippet for the single review,
wherein selecting a plurality of the partitions comprises identifying one or more combinations of the partitions, each combination including a respective subset of the partitions that are consecutive within the review and satisfying predefined length criteria.

7. The method of claim 6, wherein selecting a plurality of the partitions comprises:
determining a quality score for each partition in a respective combination; and
selecting the respective combination having a highest respective combination score, the respective combination score based on respective quality scores of the partitions in the respective combination.

8. A system for generating a review sample of a single review in a corpus of reviews, comprising:
one or more processors; and
memory storing one or more programs to be executed by the one or more processors, the one or more modules including instructions:
to identify the single review;
to partition the review into partitions;
to select a plurality of the partitions of the single review based on predefined criteria;
to generate a snippet solely for the single review including content from each of the selected plurality of the partitions, wherein the review sample of the single review comprises the generated snippet; and
to generate a response including the snippet for the single review,
wherein the instructions to select the plurality of the partitions include instructions to: identify two or more combinations of the partitions, determine a quality score for each respective combination, and select the respective combination having a highest quality score.

9. The system of claim 8, wherein the one more modules include instructions:
to determine a quality score for each of the partitions; and
to select a plurality of the partitions of the single review based on the quality scores.

10. The system of claim 9, wherein the one or more modules include instructions to determine a quality score for each of the partitions based on a length of the respective partition and at least one of the group consisting of: inverse document frequency values associated with one or more words in the respective partition, and a position of the respective partition within the review.

11. The system of claim 8, wherein the one more modules include instructions:
to determine a quality score for each of the partitions;
to select a plurality of the partitions based on a combined quality score that is based on the quality scores.

12. A system for processing reviews, comprising:
one or more processors; and
memory storing one or more programs to be executed by the one or more processors, the one or more modules including instructions:
to identify a single review;
to partition the review into one or more partitions;
to select a plurality of the partitions based on predefined criteria;
to generate a snippet solely for the single review including content from the selected plurality of the partitions; and
to generate a response including the snippet for the single review,
wherein the one or more modules include instructions to identify one or more combinations of the partitions, each combination including a respective plurality of the partitions that are consecutive within the review and satisfying predefined length criteria.

13. The system of claim 12, wherein the one or more modules include instructions:
to determine a quality score for each partition in a respective combination; and
to select the respective combination having a highest respective combination score, the respective combination score based on respective quality scores of the partitions in the respective combination.

14. A non-transitory computer readable storage medium storing one or more programs for execution by one or more processors at a server computer, the one or more programs comprising instructions for:
identifying a single review;
partitioning the review into partitions;
selecting a plurality of the partitions of the single review based on predefined criteria, wherein selecting the plurality of the partitions comprises: identifying two or more combinations of the partitions, determining a quality score for each respective combination, and selecting the respective combination having a highest quality score;
generating a snippet solely for the single review including content from each of the selected plurality of the partitions; and
generating a response including the snippet for the single review.

15. The computer readable storage medium of claim 14, wherein the instructions for selecting comprise instructions for:
determining a quality score for each of the partitions; and
selecting a plurality of the partitions of the single review based on the quality scores.

16. The computer readable storage medium of claim 15, wherein the instructions for determining comprise instructions for determining a quality score for each of the partitions based on a length of the respective partition and at least one of the group consisting of: inverse document frequency values associated with one or more words in the respective partition, and a position of the respective partition within the review.

17. The computer readable storage medium of claim 14, wherein instructions for selecting comprise:
instructions for determining a quality score for each of the partitions; and
instructions for selecting a plurality of the partitions based on a combined quality score that is based on the quality scores.

18. A non-transitory computer readable storage medium storing one or more programs for execution by one or more processors at a server computer, the one or more programs comprising instructions for:
identifying a single review;
partitioning the review into one or more partitions;
selecting a plurality of the partitions based on predefined criteria;
generating a snippet solely for the single review including content from each of the selected plurality of the partitions; and
generating a response including the snippet for the single review,
wherein the instructions for selecting a plurality of the partitions comprise identifying one or more combinations of the partitions, each combination including a respective subset of the partitions that are consecutive within the review and satisfying predefined length criteria.

19. The computer readable storage medium of claim 12, wherein the instructions for selecting a plurality of the partitions based on the quality scores comprise instructions for:
determining a quality score for each partition in a respective combination; and
selecting the respective combination having a highest respective combination score, the respective combination score based on respective quality scores of the partitions in the respective combination.

* * * * *